(12) United States Patent
Kim et al.

(10) Patent No.: US 8,418,213 B2
(45) Date of Patent: Apr. 9, 2013

(54) METHOD FOR PROVIDING CONTENTS REFERENCING INFORMATION FOR PERSONAL DATA BROADCASTING SERVICE AND RECEIVING APPARATUS AND PROCESSING METHOD

(75) Inventors: Yong-Ho Kim, Daejon (KR); Han-Kyu Lee, Daejon (KR); Jin-Woo Hong, Daejon (KR); Min-Sik Park, Daejon (KR); Gyoung-Ho Cha, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 12/307,498

(22) PCT Filed: Jul. 3, 2007

(86) PCT No.: PCT/KR2007/003214
§ 371 (c)(1),
(2), (4) Date: Oct. 13, 2009

(87) PCT Pub. No.: WO2008/004797
PCT Pub. Date: Jan. 10, 2008

(65) Prior Publication Data
US 2010/0049771 A1   Feb. 25, 2010

(30) Foreign Application Priority Data

Jul. 3, 2006 (KR) .......... 10-2006-0062193
Jun. 15, 2007 (KR) .......... 10-2007-0058983

(51) Int. Cl.
*H04N 7/173* (2011.01)
(52) U.S. Cl.
USPC ........................................... 725/86
(58) Field of Classification Search ......... 725/86
See application file for complete search history.

(56) References Cited

U.S. PATENT DOCUMENTS

| 2003/0041327 A1 | 2/2003 | Newton et al. |
| 2004/0123318 A1 | 6/2004 | Lee et al. |
| 2004/0208480 A1 | 10/2004 | Yoon et al. |
| 2005/0083865 A1 | 4/2005 | Ashley et al. |
| 2005/0083976 A1* | 4/2005 | Ashley et al. ........... 370/537 |

FOREIGN PATENT DOCUMENTS

| KR | 1020040064718 | 7/2004 |
| KR | 1020060008216 | 1/2006 |
| KR | 1020060044628 | 5/2006 |
| KR | 1020060099772 | 9/2006 |
| WO | 03/063493 A1 | 7/2003 |
| WO | WO-2004/081807 A1 | 9/2004 |

OTHER PUBLICATIONS

Korean Office Action for Application No. 9-5-2009-047980834, dated Nov. 23, 2009.

* cited by examiner

*Primary Examiner* — Brian Pendleton
*Assistant Examiner* — Olugbenga Idowu
(74) *Attorney, Agent, or Firm* — Nelson Mullins Riley & Scarborough LLP; EuiHoon Lee, Esq.

(57) ABSTRACT

There is a provided a method for providing contents referencing information (CRI) for personal data broadcasting service, including the steps of: searching a program identifier (PID) having a CRI section, and searching a container having a specific identifier; extracting container data from the searched container; searching a CRI structure which indicates a contents referencing information identifier (CRID) list from the extracted container data; searching and extracting CRID data based on a CRID data container which represents an identifier of the container having the CRID data in the CRID list of the searched CRI structure; and searching and extracting result data for the extracted CRID from a result locator.

18 Claims, 2 Drawing Sheets

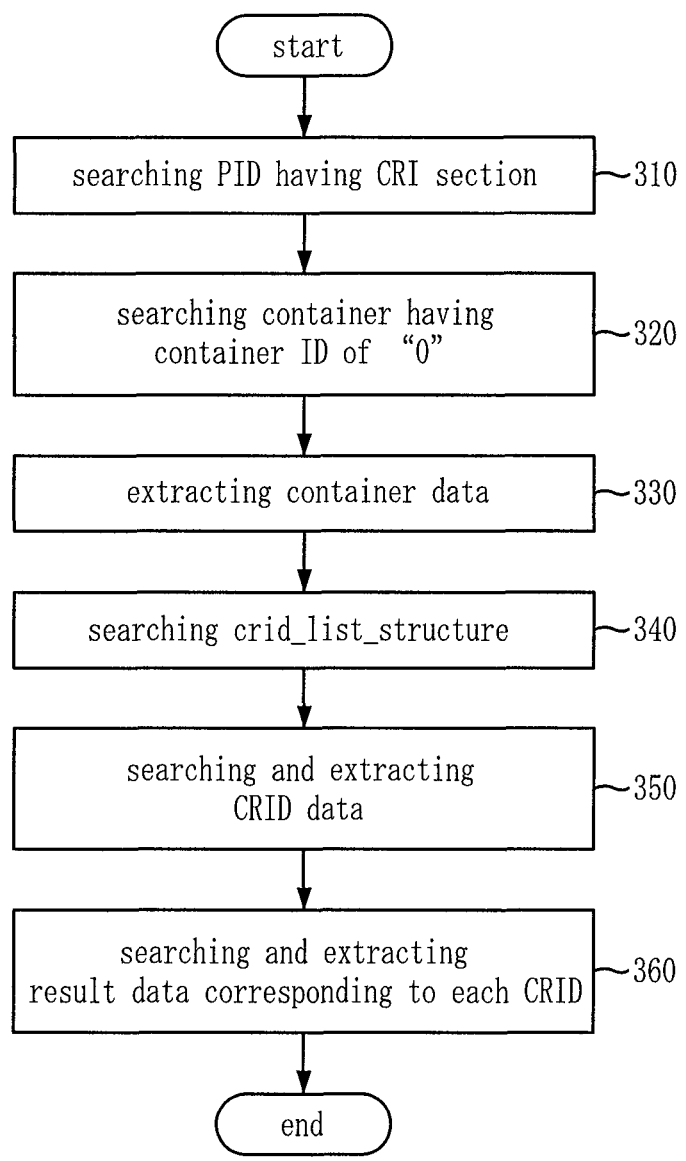

METHOD FOR PROVIDING CONTENTS REFERENCING INFORMATION FOR PERSONAL DATA BROADCASTING SERVICE AND RECEIVING APPARATUS AND PROCESSING METHOD

RELATED APPLICATIONS

This application is a 35 U.S.C. 371 national stage filing of International Application No. PCT/KR2007/003214 filed on, Jul. 3, 2007, which claims priority to Korean Patent Application No. 10-2006-0062193 filed on Jul. 3, 2006 and Korean Patent Application No. 10-2007-0058983 filed on Jun. 15, 2007. The contents of the aforementioned applications are hereby incorporated by reference.

TECHNICAL FIELD

The present invention relates to a method for providing contents referencing information for personal data broadcasting service and receiving apparatus and processing method thereof.

BACKGROUND ART

After a user checks contents referencing information (CRI) based on TV-Anytime meta data in a personal data broadcasting service, a mapping table between a real physical position and a contents referencing identifier (CRID) is requested to recognize a position of real contents when the user watches the contents or want to record the contents. This is the contents referencing information. The contents referencing information represents position determination information of the contents.

A basic regulation of the contents referencing information for a personal broadcasting service is determined by a TV-Anytime forum. At the TV-Anytime forum, the regulation for transmitting the contents referencing information to a digital video broadcasting (DVB)-based in the digital video broadcasting is defined.

The CRI in the digital video broadcasting is described simply as below. The CRI is transmitted by using a container section such as table 1 which is made based on a private_section syntax of ISO/IEC 13818-1.

TABLE 1

| Syntax | No. of bits | Identifier |
|---|---|---|
| container_section( ) { | | |
| table_id | 8 | uimsbf |
| section_syntax_indicator | 1 | bslbf |
| private indicator | 1 | bslbf |
| reserved | 2 | bslbf |
| private_section_length | 12 | uimsbf |
| container_id | 16 | uimsbf |
| reserved | 2 | bslbf |
| version number | 5 | uimsbf |
| current_next_indicator | 1 | bslbf |
| section_number | 8 | uimsbf |
| last_section_number | 8 | uimsbf |
| container_data( ) | | |
| CRC32 | 32 | uimsbf |
| } | | |

In the table 1, the CRI data is included in a container data (container_data( )). A table 2 represents a structure of the CRI data.

TABLE 2

| Syntax | No. of bits | Identifier |
|---|---|---|
| compression_wrapper( ) { | | |
| compression_method | 8 | uimsbf |
| if (compression_method == 0x00) { | | |
| container( ) | | |
| } else if (compression_method == 0x01) { | | |
| original_size | 24 | uimsbf |
| compression_structure( ) | N × 8 | |
| } | | |

In the table 2, a compression structure (compression_structure( )) represents data which is compressed through a Zlib compression process, and the container (container( )) represents uncompressed binary data. A table 3 represents a structure of the container (container( )).

TABLE 3

| Syntax | No. of bits | Identifier |
|---|---|---|
| container( ) { | | |
| container_header { | | |
| num_cri_structures | 8 | uimsbf |
| for(j=0; j<num_cri_structures; j++) { | | |
| cri_structure_type | 8 | uimsbf |
| cri_structure_id | 8 | uimsbf |
| cri_structure_ptr | 24 | uimsbf |
| cri_structure_length | 24 | uimsbf |
| } | | |
| } | | |
| for (j=0; j<num_cri_structures; j++) { | | |
| cri_structure( ) | | |
| } | | |
| } | | |

As shown in the table 3, the container (container( )) includes a plurality of CRI structures (cri_structure). The CRI structure (cri_structure) is classified as the table 4 according to utility.

TABLE 4

| cri_structure_type value | cri_structure_id value | Description |
|---|---|---|
| 0x00 | not defined | reserved |
| 0x01 | 0x00 | results list |
| 0x02 | 0x00 | data_repository |
| 0x03 | not defined | reserved |
| 0x04 | 0x00-0xFF | cri_index |
| 0x05 | 0x00-0xFF | cri_prepend_index or cri_leaf_index |
| 0x06-0x07 | not defined | reserved |
| 0x08 | 0x00 | result_data |
| 0x09 | 0x00 | services |
| 0x0A-0xEF | not defined | DVB Reserved |
| 0xF0-0xFF | not defined | User Private |

The contents referencing information has a couple of contents ID (CRID) and result. In the table 4, a CRI index (cri_index), a CRI prepend index (cri_prepend_index), and a CRI leaf index (cri_leaf_index) are corresponding to the CRID. A result list (results_list), a result data (result_data), a service (services) are corresponding to the result. A data repository (data_repository) is corresponding to all of the CTID and the result.

Accordingly, the structure is changed to be matched with a layer structure including the cri_index, the cri_prepend_index, and the cri_leaf_index to indicate the CRID. This structure has an efficient structure when extracting wanted information by searching the CRI information from a stream in a real time.

However, since the regulation defined in DVB is different from a standard regulation of a domestic ground wave and a cable digital broadcasting in service information (SI), a form of a locator form which is a part of the CRI is different. Accordingly, the CRI information is changed to be matched with an OCAP (Open Cable Application Platform) as the standard regulation of the domestic digital wire broadcasting, and an ATSC (Advanced Television System Committee) as the standard regulation of a domestic ground wave digital broadcasting. Moreover, the CRI regulation defined in the DVB is efficient for a structure that the CRI is searched and used from a broadcasting stream in the terminal. That is, a conventional CRI container structure has an index container and a result container. The CRI container which is different from a meta data container has an index container necessarily. However, the index container is the necessary information for easy search, but is not necessary information in a digital broadcasting terminal having a repository in general. A gradual search is requested to analyze the index container. More processing time and more data quantity are requested.

DISCLOSURE

Technical Problem

An embodiment of the present invention is directed to providing a method for providing contents information for personal data broadcasting service and receiving apparatus and processing method thereof, which shortens a processing time of the CRI by changing a transceiving regulation for the CRI to be matched with the STSC/OCAP, not searching a list of the CRID based on a broadcasting terminal having a repository through an index type, and providing the list of the CRID to be arranged simply.

Other objects and advantages of the present invention can be understood by the following description, and become apparent with reference to the embodiments of the present invention. Also, it is obvious to those skilled in the art of the present invention that the objects and advantages of the present invention can be realized by the unit as claimed and combinations thereof.

Technical Solution

In accordance with an aspect of the present invention, there is provided a method for providing contents referencing information (CRI) for personal data broadcasting service, including the steps of: searching a program identifier (PID) having a CRI section, and searching a container having a specific identifier; extracting container data from the searched container; searching a CRI structure which indicates a contents referencing information identifier (CRID) list from the extracted container data; searching and extracting CRID data based on a CRID data container which represents an identifier of the container having the CRID data in the CRID list of the searched CRI structure; and searching and extracting result data for the extracted CRID from a result locator.

Preferably, the present invention further includes the step of: at a broadcasting terminal, receiving the container data having a specific value for indicating the CRID list and the CRID data to a CRI structure type and a CRI structure identifier from a broadcasting system before the PID searching step.

In accordance with another aspect of the present invention, there is provided a receiving apparatus for contents conferencing information (CRI), including: a receiving means for receiving container data from a broadcasting system; a storing means for storing temporarily the container data received by the receiving means; a first extraction means for searching a program identifier having a CRI section from the data stored in the storing means, searching a container having a specific identifier, and extracting the container data from the searched container; a second extraction means for searching a CRI structure which indicates a contents referencing information identifier (CRID) list from the container data extracted by the first extraction means, and extracting CRID data through a CRID data container which indicates an identifier of the container having the CRID data in the CRID list of the searched CRI structure; and a third extraction means for searching and extracting result data for the CRID, which is extracted by the second extraction means, from a result locator.

In accordance with another aspect of the present invention, there is provided a method for processing contents referencing information (CRI) for personal data broadcasting service at receiving terminal, including the steps of: receiving and storing container data transmitted form the broadcasting system temporarily; searching a program identifier (PID) having a CRI section, and searching a container having a specific identifier of the stored container data; extracting the container data from the searched container; searching a CRI structure which indicates a contents referencing information identifier (CRID) list from the extracted container data; searching and extracting CRID data based on a CRID data container which represents an identifier of the container having the CRID data in the CRID list of the searched CRI structure; and searching and extracting result data for the extracted CRID from a result locator.

The advantages, features and aspects of the invention will become apparent from the following description of the embodiments with reference to the accompanying drawings, which is set forth hereinafter.

Advantageous Effects

As mentioned above, the present invention shortens a processing time of the CRI and provides a personal data broadcasting service by changing a transceiving regulation for the CRI to be matched with the STSC/OCAP, not searching a list of the CRID based on a broadcasting terminal having a repository through an index type, and providing the list of the CRID to be arranged simply.

BRIEF DESCRIPTION OF THE DRAWINGS

FIG. 3 is a block diagram which illustrates a contents referencing information providing method for a personal data broadcasting service in accordance with the present invention.

BEST MODE FOR THE INVENTION

Hereinafter, a preferred embodiment of the present invention will be described in detail with reference to the accompanying drawings.

In the present invention, as shown in FIG. 5, a CRI structure (cri_structure) is added to arrange a list of the CRID in case of storing and searching the list of the CRID in a repository of a terminal.

In other words, 0xF0 value is assigned to a value of a CRI structure type, and 0x00 value is assigned to a CRI structure ID value to indicate a CRID list to a container. Moreover, 0xF1 value is assigned to the CRI structure value, and 0x00 value is assigned to the CRI structure ID value.

TABLE 5

| cri structure_type value | cri_structure_id value | description |
|---|---|---|
| 0xF0 | 0x00 | crid_list |
| 0xF1 | 0x00 | crid_data |

Figure 1:
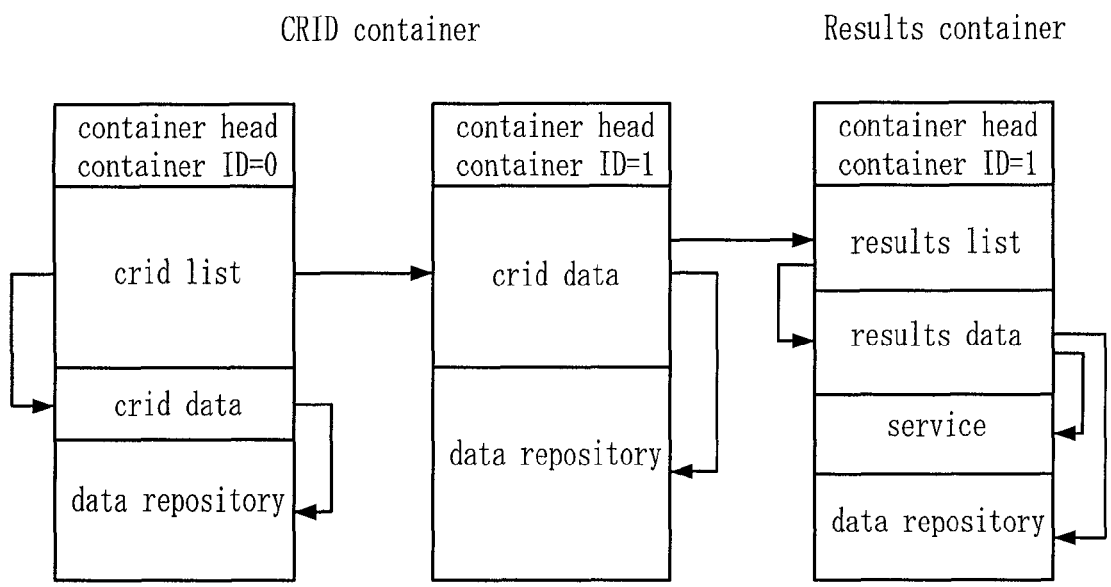
FIG. 1 and FIG. 2 are diagrams illustrating a relation between contents referencing identifier list and a results list in accordance with the present invention.
Figure 2:
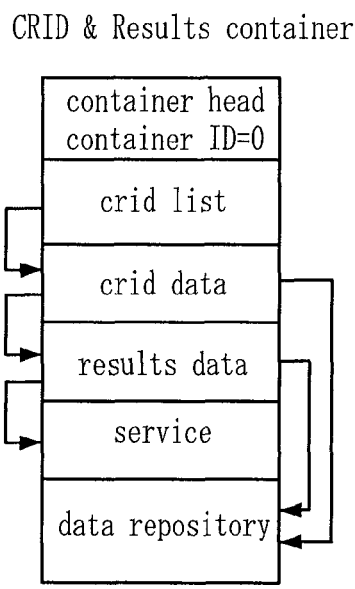

FIG. 1 and FIG. 2 illustrate an example of CRID container and result container structures respectively.

In case of not using the CRI index, the CRID container includes the CRID list (crid_list), CRID data (crid_data), and a data repository (data_repository). The result container includes a result list, a result data service, and a data repository.

FIG. 1 represents the container structure in case of having a lot of CRI data, and FIG. 2 represents the container structure in case of having little data.

FIG. 3 is a block diagram which illustrates a contents referencing information providing method in a container structure as mentioned above.

Firstly, a receiving apparatus according to the present invention includes a receiving unit for receiving container data which has a specific value for indicating the CRID list and the CRID data from a broadcasting system to a CRI structure type and a CRI structure identifier, a storing unit for storing the received container data temporarily, a first extraction unit for searching a program identifier having a CRI section from the data stored in the storing unit, searching a container having a specific identifier, and extracting the container data from the searched container, a second extraction unit for searching the CRI structure which indicates the CRID list from the container data extracted by the first extraction unit, and extracting the CRID data through the CRID data container which indicates an identifier of the container having the CRID data in the CRID list of the searched CRI structure, and a third extraction unit for searching and extracting the result data for the CRID, which is extracted by the second extraction unit, from the result locator.

Hereinafter, the CRI providing method and processing method thereof according to the present invention are described in detail with reference to FIG. 3.

A digital broadcasting terminal searches a program identifier (PID) having a CRI section at step 310. And then, the terminal searches a container having the container ID of "0" value at step 320, and extracts container data from the searched container at step 330. The steps of 310 to 330 are adapted to a case of using the CRID list such as the present invention or a conventional CRI index.

In case of using the conventional CRI index, six CRI structures are used in a CRID data extraction process. In the present invention, three CRI structures are used in the CRID data extraction process.

Firstly, in the present invention, the CRI structure (cri_structure) having a CRI structure type value of the CRID list of "0xf0" is searched in the container having the container ID of "0" at step 340. As described in table 5, if the CRI structure type value is "0xf0", the container is the CRID list.

As mentioned above, a position of the CRID data is searched and the CRID data is extracted by using the CRID data container which represents the ID of the container having the CRID data in the CRID list which is extracted from the searched CRI structure at step 350.

The prepend_CRID_data and the variable_CRID_data of the CRID data are represent a location of the CRID text in a data repository (data_repository), and if two texts are combined, one CRID data is completed.

If the CRID data is extracted, the result data for the corresponding CRID is acquired from a result locator (result_locator) at step 360.

The table 6 represents a structure of the result locator, and the table 7 represents a structure of the CRID data.

TABLE 6

| Syntax | No. of bits |
|---|---|
| crid_list( ) {  result_locator_format    for (i=0; i<sub_list_count; i++) {    crid_data_container  } } | 8  16 |

TABLE 7

| Syntax | No. of bits |
|---|---|
| crid_data( ) {  for (i=0; i<reference_count; i++) {    prepend_CRID_data    num_CRID_leaf    for (j=0; j<num_CRID_leaf; j++) {      variable_CRID_data      result_locator( )    }  } } | 16 16  16 variable |

The result data is not changed a lot relatively to a conventional DVB regulation, a change of the data syntax is performed by changing a locator form. The changed result data (result_data), a service (services), and a binary locator (binary_locator) as a part of the result data (result_data) are shown in the tables 9, 10 and 11.

TABLE 9

| Syntax | No. of bits |
|---|---|
| result_data ( ) {  for(i=0; i<Table_size; i+=size of(Result)) {    status    acquisition_flag    re_resolve_flag    result_type    imi_flag    reserved    if (status == '00') {      num_results      for (j=0; j<num_results; j++) {        if (result_type == '00') {          CRID_prepend_ptr          result_CRID_data_ptr        }        else if (result_type == '01') {          binary_locator( )        }        else if (result_type == '10') {          locator_format          locator_length          if (locator_format == 0x01) {            binary_locator( )          }          else {            for(k=0; k<locator_length; k++) {              locator_byte            }          }        }      }    }  } } | 2 1 1 2 1 1  8    16 16      4 12              8 |

TABLE 9-continued

| Syntax | No. of bits |
|---|---|
|     else { | |
|       reserved_length | 16 |
|       for (k=0; k<reserved_length; k++) { | |
|         reserved_byte | 8 |
|       } | |
|     } | |
|     if (result_type != '00' && imi_flag == '1') { | |
|       imi_prepend_ptr | 16 |
|       result_imi_data_ptr | 16 |
|     } | |
|   } | |
| } | |
| if (status == '01' || (status == '00' && | |
| re_resolve_flag == '1') { | |
|   reresolve_time | 32 |
| } | |
| } | |
| } | |

TABLE 10

| Syntax | No. of bit |
|---|---|
| binary_locator () { | |
|   network_type | 2 |
|   identifier_type | 2 |
|   inline_service | 1 |
|   reserved | 3 |
|   if (network_type == '00') { | |
|     if (inline_service == '0') { | |
|       atsc_service_duet_ID | 8 |
|     } | |
|     else { | |
|       transport_stream_id | 16 |
|       program_number | 16 |
|     } | |
|   } | |
|   else if (network_type == '10') { | |
|     source_id | 16 |
|   } | |
|   else if (network_type == '11') { | |
|     program_number | 16 |
|   } | |
|   if (identifier_type == '00') { | |
|     reserved | 2 |
|     event_id | 14 |
|   } | |
|   else if (identifier_type == '01') { | |
|     reserved | 2 |
|     data_id | 14 |
|   } | |
|   else if (identifier_type == '10') { | |
|     component_tag | 8 |
|   } | |
|   else if (identifier_type == '11') { | |
|     carousel_id | 32 |
|   } | |
|   start_time | 32 |
|   reserved | 4 |
|   duration | 20 |
| } | |

TABLE 11

| Syntax | No. of bits |
|---|---|
| Services () { | |
|   for (i=0; i<NumServices; i++) { | |
|     transport_stream_id | 16 |
|     program_number | 16 |
|   } | |
| } | |

An amended or an added part in the present invention is described as below according to a comparison with a previous regulation and contents of the tables 9, 10, and 11.

Firstly, time information of the contents in the result data (result_data) of the table 9 and the binary locator (binary_locator) of the table 10 are changed into a GPS (Global Positioning system) second used in an ATSC/OCAP. A flag (network_type) which discriminates a ground wave and a cable is added to the binary locator (binary_locator). Moreover, contents for the locator are changed to be adapted to an environment which is changed from the DVB to the ATSC/OCAP. That is, a transport stream ID (transport_stream_ID) and a program number (program_number) are used instead of the locator form including the transport stream ID (transport_stream_id), an original network ID (original_network_id) and a service ID (service_id). A source ID (source_id) is used in a cable environment. An out of band (OOB) program number (program_number) is added in case of transmitting data from a cable broadcasting to the OOB. The event ID (event_id), a data ID (data_id) and a component tag (component_tag) are added to be adapted to each case to describe the locator form.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the scope of the invention as defined in the following claims.

What is claimed is:

1. A method for providing contents referencing information (CRI) for personal data broadcasting service, comprising the steps of:
   searching a program identifier (PID) having a CRI section, and searching a container having a specific identifier;
   extracting container data from the searched container;
   searching a CRI structure which indicates a contents referencing information identifier (CRID) list from the extracted container data;
   searching and extracting CRID data based on a CRID data container which represents an identifier of the container having the CRID data in the CRID list of the searched CRI structure; and
   searching and extracting result data for the extracted CRID data from a result locator,
   wherein the CRI structure is added to the container data in order to arrange a list of the CRID,
   wherein the CRI structure is assigned to a value of CRI structure type for indicate the CRID list.

2. The method of claim 1, further comprising the step of:
   at a broadcasting terminal, receiving the container data having a specific value for indicating the CRID list and the CRID data to a CRI structure type and a CRI structure identifier from a broadcasting system before the PID searching step.

3. The method of claim 1, wherein time information of contents in the result data and the result locator is indicated as a global positioning system (GPS) second.

4. The method of claim 3, wherein a flag for discriminating a ground wave and a cable is included in the binary locator.

5. The method of claim 3, wherein a transport stream ID and a program number are included in the binary locator.

6. The method of claim 5, wherein a source ID for a cable environment is included in the binary locator.

7. The method of claim 6, wherein an out of band (OOB) program is included in the binary locator for a program which is received through an OOB channel in a cable broadcasting.

8. The method of claim 6, wherein a data identifier is included in the binary locator.

9. The method of claim 6, wherein a carousel identifier is included in the binary locator.

10. A receiving apparatus for contents conferencing information (CRI), comprising:
- a receiving unit configured to search container data from a broadcasting system;
- a storing unit configured to store temporarily the container data received by the receiving unit;
- a first extraction unit configured to search a program identifier having a CRI section from the data stored in the storing unit, searching a container having a specific identifier, and extracting the container data from the searched container;
- a second extraction unit for searching a CRI structure which indicates a contents referencing information identifier (CRID) list from the container data extracted by the first extraction unit, and extracting CRID data through a CRID data container which indicates an identifier of the container having the CRID data in the CRID list of the searched CRI structure; and
- a third extraction unit configured to search and extract result data for the CRID data, which is extracted by the second extraction unit, from a result locator,
- wherein the CRI structure is added to the container data in order to arrange a list of the CRID,
- wherein the CRI structure is assigned to a value of CRI structure type for indicate the CRID list.

11. The apparatus of claim 10, wherein time information of contents in the result data and the result locator is indicated as a global positioning system (GPS) second.

12. The apparatus of claim 11, wherein a flag for discriminating a ground wave and a cable is included in the binary locator.

13. The apparatus of claim 11, wherein a transport stream ID and a program number are included in the binary locator.

14. The apparatus of claim 11, wherein a source ID for a cable environment is included in the binary locator.

15. The apparatus of claim 11, wherein an out of band (OOB) program is included in the binary locator for a program which is received through an OOB channel in a cable broadcasting.

16. The apparatus of claim 11, wherein a data identifier is included in the binary locator.

17. The apparatus of claim 11, wherein a carousel identifier is included in the binary locator.

18. A method for processing contents referencing information (CRI) for personal data broadcasting service at receiving terminal, comprising the steps of:
- receiving and storing container data transmitted from the broadcasting system temporarily;
- searching a program identifier (PID) having a CRI section, and searching a container having a specific identifier of the stored container data;
- extracting the container data from the searched container;
- searching a CRI structure which indicates a contents referencing information identifier (CRID) list from the extracted container data;
- searching and extracting CRID data based on a CRID data container which represents an identifier of the container having the CRID data in the CRID list of the searched CRI structure; and
- searching and extracting result data for the extracted CRID data from a result locator,
- wherein the CRI structure is added to the container data in order to arrange a list of the CRID,
- wherein the CRI structure is assigned to a value of CRI structure type for indicate the CRID list.

* * * * *